United States Patent [19]

Murakami et al.

[11] Patent Number: 5,725,687
[45] Date of Patent: Mar. 10, 1998

[54] WEAR-RESISTANT HIGH PERMABILITY ALLOY AND METHOD OF MANUFACTURING THE SAME AND MAGNETIC RECORDING AND REPRODUCING HEAD

[75] Inventors: Yuetsu Murakami; Katashi Masumoto, both of Sendai, Japan

[73] Assignee: The Foundation: The Research Institute of Electric and Magnetic Alloys, Japan

[21] Appl. No.: 550,502

[22] Filed: Oct. 30, 1995

[30] Foreign Application Priority Data

Nov. 16, 1994 [JP] Japan ................ 6-319002

[51] Int. Cl.$^6$ ................ H01F 1/00
[52] U.S. Cl. ............ 148/312; 148/426; 420/441; 420/442; 420/452; 420/455; 420/456; 420/458; 420/459; 420/460
[58] Field of Search ............... 148/312, 426; 420/441, 442, 452, 455, 456, 458, 459, 460

[56] References Cited

U.S. PATENT DOCUMENTS

| | | | |
|---|---|---|---|
| 3,837,933 | 9/1974 | Masumoto et al. | 148/31.55 |
| 4,297,135 | 10/1981 | Giessen et al. | 75/123 B |
| 4,710,243 | 12/1987 | Masumoto et al. | 148/312 |
| 5,104,464 | 4/1992 | Hasegawa | 148/300 |
| 5,496,419 | 3/1996 | Murakami et al. | 148/312 |
| 5,585,984 | 12/1996 | Hasegawa | 360/113 |

FOREIGN PATENT DOCUMENTS

| | | |
|---|---|---|
| 4-006249 | 1/1992 | Japan . |
| 990607 | 4/1965 | United Kingdom . |
| 1019679 | 2/1966 | United Kingdom . |
| 2086424 | 5/1982 | United Kingdom . |
| 2280452 | 2/1995 | United Kingdom . |

*Primary Examiner*—Stevan A. Resan
*Attorney, Agent, or Firm*—Parkhurst & Wendel, L.L.P

[57] ABSTRACT

The present invention relates to a wear-resistant high permeability alloy consisting of Ni, Nb, C and Fe, a wear-resistant high permeability alloy consisting of Ni, Nb, C and Fe as main components and at least one element selected from the group consisting of Cr, Mo, Ge, Au, Co, V, W, Cu, Ta, Mn, Al, Si, Ti, Zr, Hf, Sn, Sb, Ga, In, Tl, Zn, Cd, rare earth element, platinum element, Be, Ag, Sr, B, P, N, O, S as a secondary component and a method of manufacturing the same and a magnetic recording and reproducing head, and an object of the invention is to obtain an excellent wear-resistant magnetic alloy having easy forging processability, a large effective permeability, a saturated flux density of more than 4000G, and a recrystallization texture of $\{110\}<112>+\{311\}<112>+\{111\}<112>$, and a wear-resistant high permeability alloy consisting by weight of Ni 60–90%, Nb 0.5–14%, C 0.0003–0.7% and the remainder Fe and a small amount of impurities, and having a recrystallization texture of $\{110\}<112>+\{311\}<112>+\{111\}<112>$ with an effective permeability of more than 3000 at 1 KHz and a saturated flux density of more than 4000G.

2 Claims, 10 Drawing Sheets

FIG_4

FIG_5

FIG_7

WEAR-RESISTANT HIGH PERMEABILITY ALLOY AND METHOD OF MANUFACTURING THE SAME AND MAGNETIC RECORDING AND REPRODUCING HEAD

BACKGROUND OF THE INVENTION

1. Field of the Invention

The present invention relates to a wear-resistant high permeability alloy consisting of Ni, Nb, C and Fe, a wear-resistant high permeability alloy consisting of Ni, Nb, C and Fe as main components and at least one element selected from the group consisting of Cr, Mo, Ge, Au, Co, V, W, Cu, Ta, Mn, Al, Si, Ti, Zr, Hf, Sn, Sb, Ga, In, Tl, Zn, Cd, rare earth element, platinum element, Be, Ag, Sr, Ba, B, P, N, O, S as a secondary component and a method of manufacturing the same and a magnetic recording and reproducing head.

An object of the invention is to provide an excellent wear-resistant high permeability alloy having a recrystallization texture of {110}<112>+{311}<112>+{111}<112> with easy forging processability, a large effective permeability and a saturated flux density of more than 4000G.

2. Related Art Statement

A magnetic recording and reproducing head for tape recorder and video tape recorder is operated in an alternating current magnetic field, so that a magnetic alloy used therefor is required to have a large effective permeability in a high frequency magnetic field, and desired to be highly wear-resistant because the head is positioned to be in sliding contact with a magnetic tape. At present, as a magnetic alloy having an excellent wear resistance for magnetic recording and reproducing head, there are Sendust (Fe-Si-Al alloy) and ferrite ($MnO-ZnO-Fe_2O_3$), but they are very hard and brittle, thereby it is impossible to process for forging and rolling, so that grinding and polishing processes are used for manufacturing a magnetic head core, and as a result, the product thereof becomes expensive. Moreover, Sendust has a large saturated flux density, but cannot be formed into a thin sheet, so that its effective permeability is relatively small in high frequency magnetic field. On the other hand, ferrite has a large effective permeability, but has a disadvantageously small saturated flux density such as 4000G. Moreover, a permalloy (Ni-Fe alloy) has a large saturated flux density, but has a small effective permeability, and is easy in forging, rolling and punching, and excellent in mass production, but it is still easily worn out, so that there is strongly desired to improve a wear-resistant property.

SUMMARY OF THE INVENTION

The present inventors have previously found that an Ni-Fe-Nb alloy is easily forgeable and has a high hardness and a high permeability, so as to be suitable as a magnetic alloy for a magnetic recording and reproducing head, and disclosed (Japanese Patent Application Publication No. 47-29690). Thereafter, the present inventors have systematically continued a study of wearability of the Ni-Fe-Nb alloy, and as a result, it becomes clear that wear is not unconditionally determined by hardness, but closely relates to the recrystallization texture of the alloy.

In general, it has been known that a wear phenomenon largely differs by the orientation of an alloy crystal and a crystalline anisotropy is existent. That is, the present inventors have previously disclosed that a {100}<001> recrystallization texture is easily worn out in Ni-Fe-Nb alloy, and recrystallization textures of {110}<112> and {311}<112> rotated about this <112> orientation are excellent in wear resistance (Japanese Patent Application Publication No. 5-45658). However, there is recently every indication that magnetic recording and reproducing apparatus and equipment should be highly efficient, and as a result, there is strongly demanded to more improve easy forgeability, magnetic properties and wear resistance.

While the present inventors have executed a study for forming a recrystallization texture of {110}<112>+{311}<112> of an Ni-Fe-Nb alloy, there has been found that development of a {100}<001> is controlled by adding 0.0003–0.7% of C, preferably 0.0007–0.5% of C, more preferably 0.001–0.5% of C, to the alloy, a recrystallization texture of {111}<112> having a newly extremely excellent wear resistance other than {110}<112>+{311}<112> of recrystallization texture is formed by suppressing the development of recrystallization texture of {100}<001>, and the wear resistance property is remarkably improved. That is, it has been known that an Ni-Fe binary alloy produces a crystal texture of {110}<112>+{112}<111> by cold rolling, but if it is heated at high temperature, a {100}<001> recrystallization texture is developed. However, when Nb is added thereto, the stacking fault energy is lowered, the development of a recrystallization texture of {110}<001> is strongly suppressed in recrystallization, the growth of a recrystallization texture of {110}<112>+{311}<112> is preferentially accelerated, and a recrystallization of {110}<112>+{311}<112> is formed. When C is further added to this Ni-Fe-Nb alloy, a carbide is separated between grains, intergranular energy is lowered, in addition to the recrystallization texture of {110}<112>+{311}<112> in recrystallization, a recrystallization texture of {111}<112> rotated about this <112> orientation is newly formed, and the wear resistance is remarkably improved. It has also been found that when C is added to an Ni-Fe-Nb alloy, a hard carbide is separated in a matrix so as to contribute to improvement of wear resistance, a magnetic domain is divided by dispersion and separation of these ferromagnetic, soft magnetic and nonmagnetic fine carbides, and an eddy current loss in an alternating current field is decreased, so that an effective permeability is increased. In short, a recrystallization texture of {110}<112>+{311}<112>+{111}<112> is developed, an effective permeability is increased and a high permeability alloy having an extremely excellent wear resistance is obtained by synergistic effect of Nb and C. Moreover, when adding to this Ni(nickel)-Fe(iron)-Nb(niobium)-C(carbon) alloy a proper amount of at least one element selected from the group consisting of Cr (chromium), Mo (molybdenum), Ge (germanium), Au (gold), Co (cobalt), V (vanadium), W (tungsten), Cu (copper), Ta (tantalum), Mn (manganese), Al (aluminum), Si (silicon), Ti (titanium), Zr (zirconium), Hf (hafnium), Sn (tin), Sb (antimony), Ga (gallium), In (indium), Tl (thallium), Zn (zinc), Ce (cadmium), rare earth element, platinum element, Be (beryllium), Ag (silver), Sr (strontium), Ba (barium), B (boron), P (phosphorus), N (nitrogen), O (oxygen) and S (sulfur), an effective permeability is increased and a wear resistance is improved.

In order to manufacture an alloy of the present invention, a suitable amount of Ni 60–90% by weight, Nb 0.5–14% by weight, C 0.0003–0.7% by weight, preferably 0.0007–0.5% by weight, more preferably 0.001–0.5% by weight, and the remainder Fe are molten in air, preferably a non-oxidizing atmosphere (hydrogen, argon, nitrogen and the like) or in vacuo by using a suitable smelting furnace, such as a high frequency smelting surface and the like, thereafter as they are, or further added as a secondary component a predetermined amount of 0.001–30% in total of of less than 7% of Cr, Mo, Ge, Au, less than 10% of Co and V, less than 15% of W, less than 25% of Cu, Ta, Mn, less than 5% of Al, Si, Ti, Zr, Hf, Sn, Sb, Ga, In, Tl, Zn, Cd, rare earth element and platinum element, less than 3% of Be, Ag, Sr, Ba, less than 1% of B, less than 0.7% of P, less than 0.3% of N, less than 0.3% of O and less than 0.1% of S, fully stirred to manufacture a uniformly molten alloy in composition. In this case, it is preferable to use carbide, nitride, oxide, sulfide and the like of each of the above elements as raw material.

Then, the thus obtained alloy is injected into a mold of suitable shape and size to obtain a sound ingot, the ingot is further hot worked (forged, hot rolled and the like) at a temperature above 900° C. and below a melting point, preferably above 1000° C. and below a melting point to form a sheet of suitable thickness, and annealed, if necessary. Then, the sheet is cold worked at a working ratio of more than 50% by a method such as cold rolling and the like, and there is manufactured a thin sheet of shape aimed at, such as 0.1 mm thick.

Then, a ring-like sheet of 45 mm in outer diameter and 33 mm in inner diameter is punched from the thin sheet, and the ring-like sheet is heated in the atmosphere, preferably hydrogen and other suitable non-oxidizing atmosphere (argon, nitrogen and the like) or in vacuo at a temperature above 900° C. and below a melting point, preferably above 1000° C. and below a melting point for suitable time corresponding to a heating temperature, then cooled from a temperature of more than an ordered-disordered lattice transformation point (about 600° C.) at a suitable cooling rate of 100° C./sec to 1° C./hr corresponding to the composition, or further heated at a temperature of less than an ordered-disordered lattice transformation point (about 600° C.) for suitable time corresponding to the reheating temperature, and cooled. Thus, there is obtained a wear-resistant high permeability alloy having more than 3000 of an effective permeability, more than 4000G of a saturated flux density and a recrystallization texture of $\{110\}<112>+\{311\}<112>+\{111\}<112>$.

The gists of the present invention are as follows.

An object of the present invention is to provide an wear-resistant high permeability alloy essentially consisting of by weight of Ni 60–90%, Nb 0.5–14%, C 0.0003–0.7% and the remainder Fe and a small amount of impurities, and having a recrystallization texture of $\{110\}<112>+\{311\}<112>+\{111\}<112>$ with an effective permeability of more than 3000 at 1 KHz and a saturated flux density of more than 4000G.

Another object of the present invention is to provide an wear-resistant high permeability alloy consisting of by weight of Ni 60–90%, Nb 0.5–14%, C 0.0003–0.7%, and as a secondary component 0.001–30% in total of at least one element selected from the group consisting of less than 7% of Cr, Mo, Ge, Au, respectively, less than 10% of Co, V, respectively, less than 15% of W, less than 25% of Cu, Ta, Mn, respectively, less than 5% of Al, Si, Ti, Zr, Hf, Sn, Sb, Ga, In, Tl, Zn, Cd, rare earth element, and platinum element, respectively, less than 3% of Be, Ag, Sr, Ba, respectively, less than 1% of B, less than 0.7% of P, less than 0.3% of N, less than 0.3% of O, less than 0.1% of S and the remainder Fe and a small amount of impurities, and having a recrystallization texture of $\{110\}<112>+\{311\}<112>+\{111\}<112>$ with an effective permeability of more than 3000 at 1 KHz, a saturation flux density of more than 4000G.

A further object of the present invention is to provide a method of manufacturing an wear-resistant high permeability alloy comprising hot working an alloy consisting of by weight of Ni 60–90%, Nb 0.5–14%, C 0.0003–0.7% and the remainder Fe and a small amount of impurities at a temperature above 900° C. and below a melting point, thereafter cooling, then cold working at a working ratio of more than 50%, heating at a temperature above 900° C. and below a melting point, and cooling from a temperature above an ordered-disordered lattice transformation point to a room temperature at a predetermined cooling rate of 100° C./sec to 1° C./hr corresponding to the composition, thereby forming an alloy having a recrystallization texture of $\{110\}<112>+\{311\}<112>+\{111\}<112>$ with an effective permeability of more than 3000 at 1 KHz and a saturated flux density of more than 4000G.

A still further object of the present invention is to provide a method of manufacturing a wear-resistant high permeability alloy comprising hot working an alloy consisting of by weight of Ni 60–90%, Nb 0.5–14%, C 0.0003–0.7% and the remainder Fe and a small amount of impurities at a temperature above 900° C. and below a melting point, thereafter cooling, then cold working at a working ratio of more than 50%, heating at a temperature above 900° C. and below a melting point, and cooling from a temperature above an ordered-disordered lattice transformation point to a room temperature at a predetermined cooling rate of 100° C./sec to 1° C./hr corresponding to the composition, further heating at a temperature below an ordered-disordered lattice transformation point for a predetermined time from more than 1 minute to less than 100 hours corresponding to the composition, and cooling, thereby forming an alloy having a recrystallization texture of $\{110\}<112>+\{311\}<112>+\{111\}<112>$ with an effective permeability of more than 3000 at 1 KHz and a saturated flux density of more than 4000G.

Another object of the present invention is to provide a method of manufacturing a wear-resistant high permeability alloy comprising hot working an alloy consisting of by weight of Ni 60–90%, Nb 0.5–14%, C 0.0003–0.7%, and as a secondary component 0.001–30% in total of at least one element selected from the group consisting of less than 7% of Cr, Mo, Ge, Au, respectively, less than 10% of Co, V, respectively, less than 15% of W, less than 25% of Cu, Ta, Mn, respectively, less than 5% of Al, Si, Ti, Zr, Hf, Sn, Sb, Ga, In, Tl, Zn, Cd, rare earth element and platinum element, respectively, less than 3% of Be, Ag, Sr, Ba, respectively, less than 1% of B, less than 0.7% of P, less than 0.3% of N, less than 0.3% of O, less than 0.1% of S and the remainder Fe and a small amount of impurities at a temperature above 900° C. and below a melting point, thereafter cooling, then cold working at a working ratio of more than 50%, heating at a temperature above 900° C. and below a melting point, and cooling from a temperature above an ordered-disordered lattice transformation point to a room temperature at a predetermined cooling rate of 100° C./sec to 1° C./hr corresponding to the composition, thereby forming an alloy having a recrystallization texture of $\{110\}<112>+\{311\}<112>+\{111\}<112>$ with an effective permeability of more than 3000 at 1 KHz and a saturated flux density of more than 4000G.

A further object of the present invention is to provide a method of manufacturing a wear-resistant high permeability alloy comprising hot working an alloy consisting of by weight of Ni 60–90%, Nb 0.5–14%, C 0.0003–0.7%, and as a secondary component 0.001–30% in total of at least one element selected from the group consisting of less than 7% of Cr, Mo, Ge, Au, respectively, less than 10% of Co, V, respectively, less than 15% of W, less than 25% of Cu, Ta, Mn, respectively, less than 5% of Al, Si, Ti, Zr, Hf, Sn, Sb, Ga, In, Tl, Zn, Cd, rare earth element and platinum element, respectively, less than 3% of Be, Ag, Sr, Ba, respectively, less than 1% of B, less than 0.7% of P, less than 0.3% of N, less than 0.3% of O, less than 0.1% of S and the remainder Fe and a small amount of impurities at a temperature above 900° C. and below a melting point, thereafter cooling, then cold working at a working ratio of more than 50%, heating at a temperature above 900° C. and below a melting point, and cooling from a temperature above an ordered-disordered lattice transformation point to a room temperature at a predetermined cooling rate of 100° C./sec to 1° C./hr corresponding to the composition, further heating at a temperature below an ordered-disordered lattice transformation point for a predetermined time from more than 1 minute to less than 100 hours corresponding to the composition and cooling, thereby forming an alloy having a recrystallization texture of {110}<112>+{311}<112>+{111}<112> with an effective permeability of more than 3000 at 1 KHz and a saturated flux density of more than 4000G.

A still further object of the present invention is to provide a magnetic recording and reproducing head made of a wear-resistant high permeability alloy consisting by weight of Ni 60–90%, Nb 0.5–14%, C 0.0003–0.7% and the remainder Fe and a small amount of impurities, and having a recrystallization texture of {110}<112>+{311}<112>+ {111}<112> with an effective permeability of more than 3000 at 1 KHz and a saturated flux density of more than 4000G.

An object of the present invention is to provide a magnetic recording and reproducing head made of a wear-resistant high permeability alloy consisting of by weight of Ni 60–90%, Nb 0.5–14%, C 0.0003–0.7%, and as a secondary component 0.001–30% in total at at least one element selected from the group consisting of less than Cr, Mo, Ge, Au, respectively, less than 10% of Co, V, respectively, less than 15% of W, less than 25% of Cu, Ta, Mn, respectively, less than 5% of Al, Si, Ti, Zr, Hf, Sn, Sb, Ga, In, Tl, Zn, Cd, rare earth element and platinum element, respectively, less than 3% of Be, Ag, Sr, Ba, respectively, less than 1% of B, less than 0.7% of P, less than 0.3% of N, less than 0.3% of O and less than 0.1% of S and the remainder Fe and a small amount of impurities, and having a recrystallization texture of {110}<112>+{311}<112>+{111}<112> with an effective permeability of more than 3000 at 1 KHz and a saturated flux density of more than 4000G.

BRIEF DESCRIPTION OF THE DRAWINGS

For a better understanding of the invention, reference is made to the accompanying drawings.

DESCRIPTION OF THE PREFERRED EMBODIMENTS

The present invention is further explained by referring to the drawings in detail.

Figure 1:
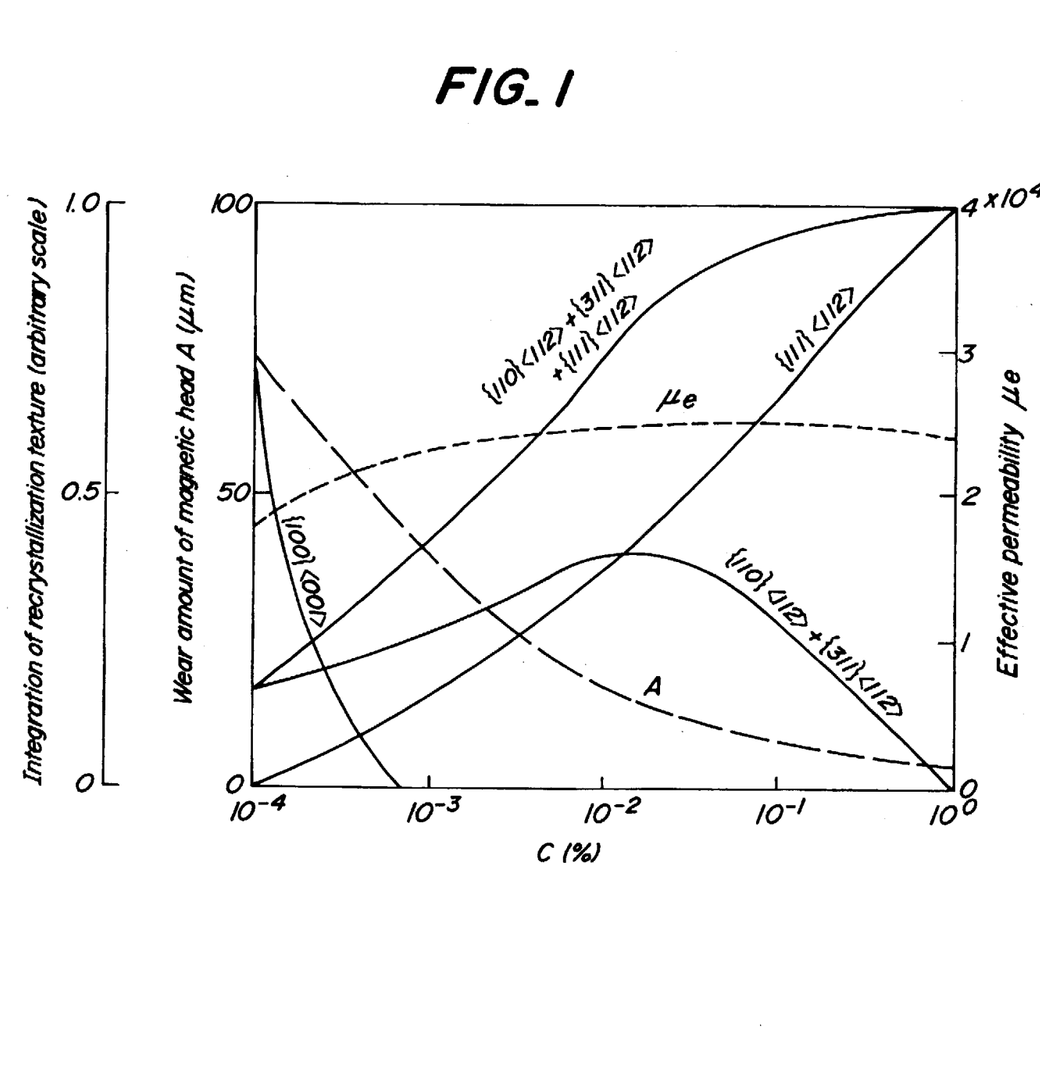
FIG. 1 is a graph showing the relationship between various properties and C amount of 80.3% Ni-Fe-5.5% Nb-C alloy.

FIG. 1 shows the relationship of a recrystallization texture, various properties and an amount of C in case of cold rolling a 80.3% Ni-Fe-5.5% Nb-C alloy at a working ratio of 90%, heating in hydrogen at 1150° C. and thereafter cooling at a cooling rate of 600° C./hr. When an Ni-Fe-Nb alloy is cold rolled, a work recrystallization texture of {110}<112>+{112}<111> is generated, but when the texture is heated at a high temperature, recrystallization textures of {100}<001> and {110}<112>+{311}<112> are formed. However, when C is added thereto, the formation of a recrystallization texture of {100}<001> is suppressed, and a recrystallization texture of {111}<112> is newly developed to {110}<112>+{311}<112>, but when C is further increased, the recrystallization texture of {110}<112>+ {311}<112> is reduced, while the recrystallization of {111}<112> having an extremely excellent wear resistance is considerably increased, and as a result, the recrystallization texture of {110}<112>+{311}<112>+{111}<112} is increased and a wear amount is considerably reduced as increase of the recrystallization texture of {111}<112>. Moreover, an effective permeability is increased by an addition of C, but forging becomes unfavorably difficult when the amount of C is more than 0.7%.

Figure 2:
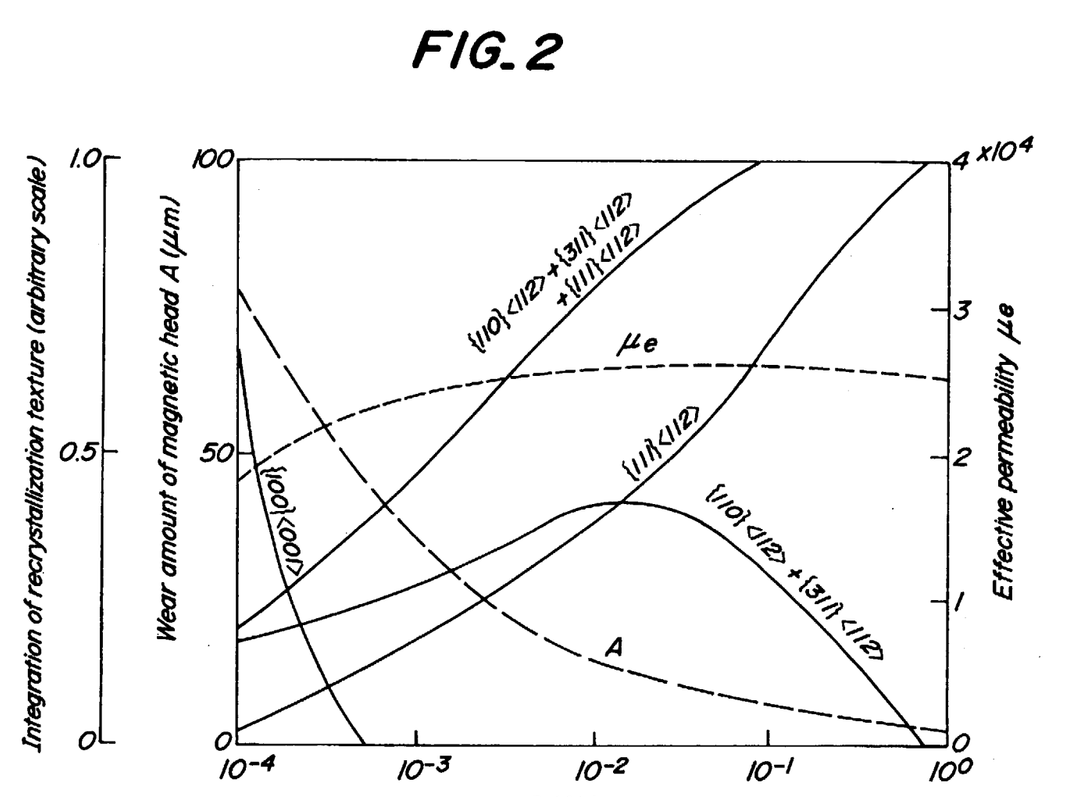
FIG. 2 is a graph showing the relationship between various properties and C among of 79.8% Ni-Fe-6.0Nb-C alloy.

FIG. 2 shows the relationship between a recrystallization texture, various properties and an amount of C in case of cold rolling a 79.8% Ni-Fe-6.0% Nb-C alloy at a working ratio of 85%, heating in hydrogen at 100° C., thereafter cooling at a cooling rate of 400° C./hr. The relationship between the recrystallization texture, various properties and the amount of C shows substantially the same tendency as in the case of FIG. 1, and it is apparent that the recrystallization texture of {111}<112> is developed together with an increase of the amount of C, and a wear resistance is considerably improved.

Figure 3:
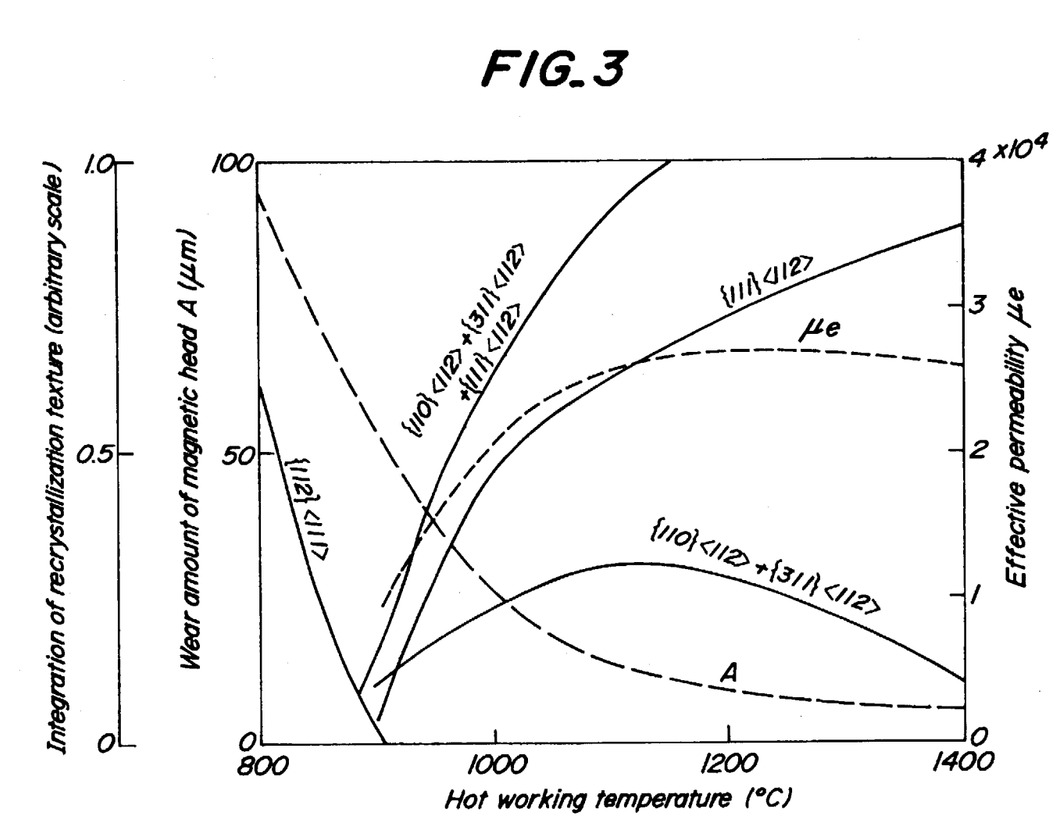
FIG. 3 is a graph showing the relationship between various properties and hot working temperature of 79.8% Ni-Fe-6.0% Nb-0.083% C alloy.

FIG. 3 shows the relationship of a hot working temperature, a recrystallization texture and various properties of a 79.8% Ni-Fe-6.0% Nb-0.083% alloy. When the hot working temperature is increased of more than 900° C., the recrystallization texture of {112}<111> is decreased, and the recrystallization textures of {110}<112>+{311}<112> and {111}<112> having an excellent wear resistance are increased, but the recrystallization of {110}<112>+ {311}<112> is decreased at a temperature of more than about 1200° C. On the other hand, {111}<112> having an extremely excellent wear resistance is increased, and as a result, the recrystallization texture of {110}<112>+ {311}<112>+{111}<112> is increased, and a wear amount is considerably decreased. Moreover, an effective permeability is increased together with the hot working temperature.

Figure 4:
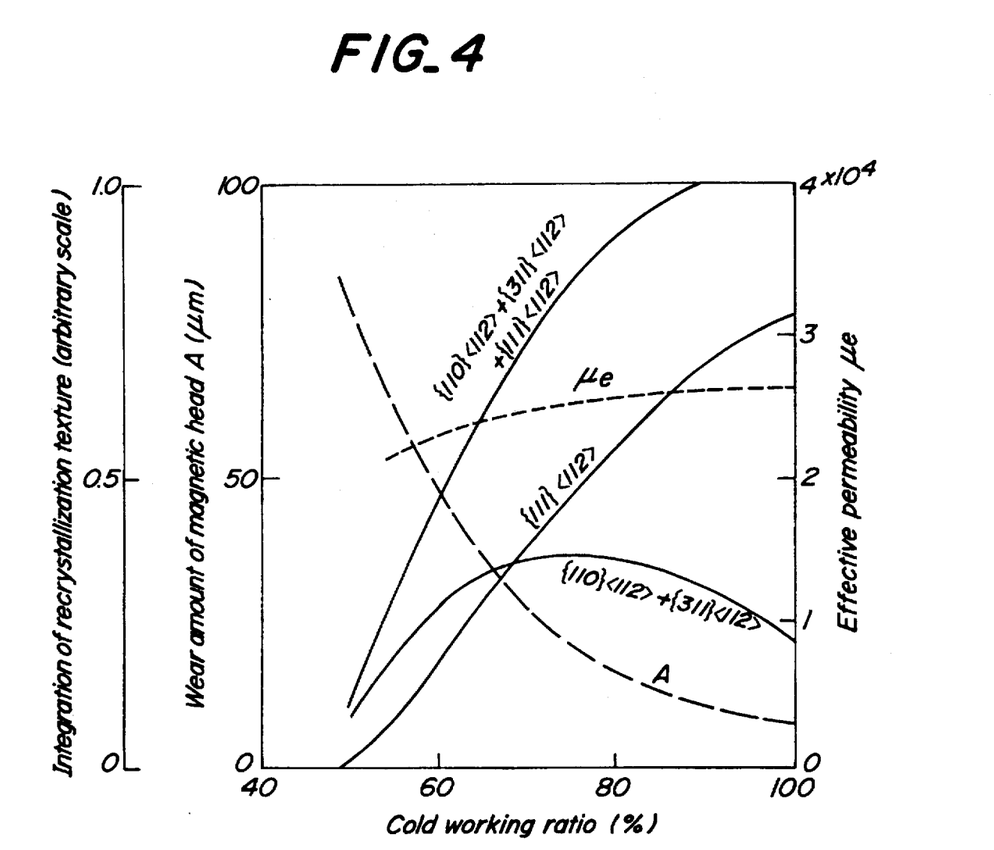
FIG. 4 is a graph showing the relationship between various properties and cold working ratio of 79.8% Ni-Fe-6.0% Nb-0.083% C alloy.

FIG. 4 shows the relationship between a recrystallization texture, various properties and a cold working ratio of a 79.8% Ni-Fe-6.0% Nb-0.083% C alloy in case of heating at 1100° C. The increase of a cold working ratio brings development of the recrystallization textures of {110}<112>+{311}<112> having an excellent wear resistance but the recrystallization texture of {110}<112>+ {311}<112> is decreased at more than 80% of a cold working ratio. However, {111}<112> having an extremely excellent wear resistance is considerably increased, and as a result, the recrystallization texture of {110}<112>+ {311}<112>+{111}<112> is increased, and a wear amount is considerably decreased.

Moreover, an effective permeability is increased together with the cold working ratio.

Figure 5:
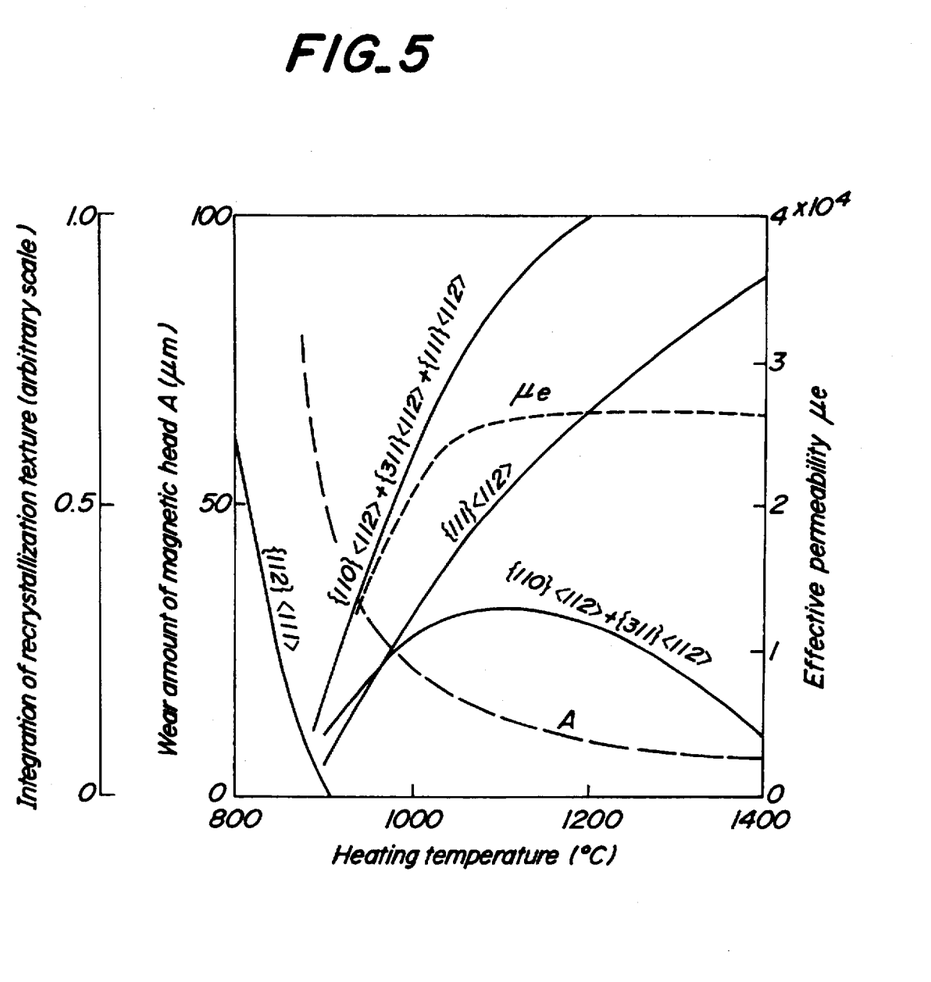
FIG. 5 is a graph showing the relationship between various properties and heating temperature of 79.8% Ni-Fe-6.0% Nb-0.083C alloy.

FIG. 5 shows the relationship between a heating temperature, a recrystallization texture and various properties of a 79.8Ni% -Fe-6.0% Nb-0.083% C alloy after rolling at 85% of a cold working ratio. With the increase of a heating temperature, a component of recrystallization texture of {112}<111> is decreased, and recrystallization textures of {110}<112>+{311}<112> and {111}<112> are increased, but {110}<112>+{311}<112> is decreased at about more than 1200° C. However, the recrystallization texture of {110}<112> having an extremely excellent wear resistance is considerably increased, and as a result, the recrystallization texture of {110}<112>+{311}<112>+ {111}<112> is increased, and a wear resistance is considerably increased. Moreover, an effective permeability is increased with the increase of the heating temperature.

Figure 6:
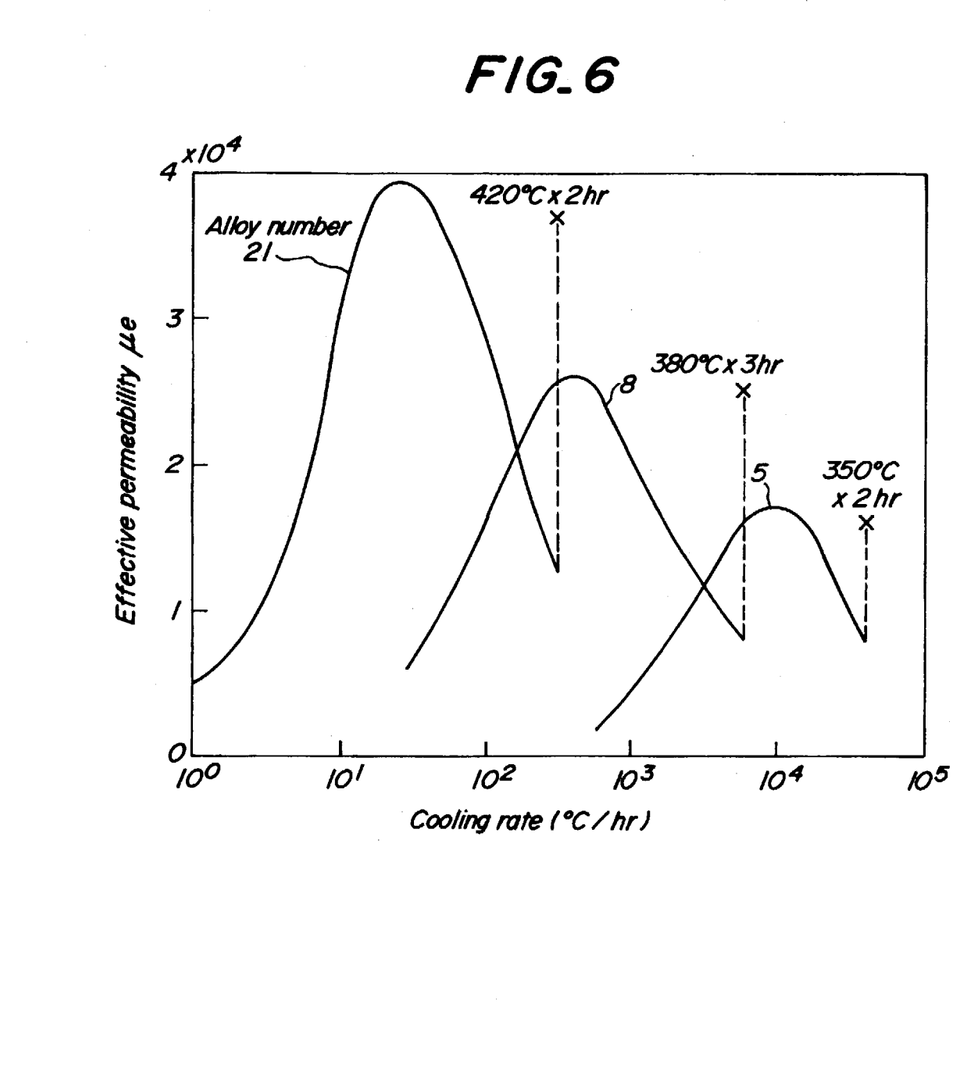
FIG. 6 is a graph showing the relationship between effective permeability and cooling rate and between reheating temperature and reheating time of 78.8% Ni-Fe-2.0% Nb-0.364% C alloy (Alloy No. 5), 79.8% Ni-Fe-6.0Nb-0.083% C alloy (Alloy No. 8) and 81.0% Ni-Fe-4.5% Nb-0.074% C-3.0% Cr alloy (Alloy No. 21).

FIG. 6 shows the relationship between an effective permeability and a cooling rate of Alloy No. 5 (78.8% Ni-Fe-2.0% Nb-0.364% C alloy), Alloy No. 8 (79.8% Ni-Fe-6.0% Nb-0.083% C alloy), and Alloy No. 21 (81.0% Ni-Fe-4.5% Nb-0.074% C-3.0% Cr alloy) and an effective permeability (mark x) in case of further applying a reheating treatment to these alloys. As apparent from FIG. 6, when a reheating treatment is applied to a specimen of Alloy No. 21 at 420° C. for 2 hours, an effective permeability is remarkably improved such as 3.7×10⁴. Moreover, a reheating treatment is applied to a specimen of Alloy No. 8 at 380° C. for 3 hours, an effective permeability is improved such as 2.5× 10⁴. Furthermore, when a reheating treatment is applied to a specimen of Alloy No. 5 at 350° C. for 2 hours, an effective permeability is improved such as 1.6×10⁴. That is, it is understood that there are existent an optimum cooling rate, an optimum reheating temperature and reheating time corresponding to the composition of an alloy.

Figure 7:
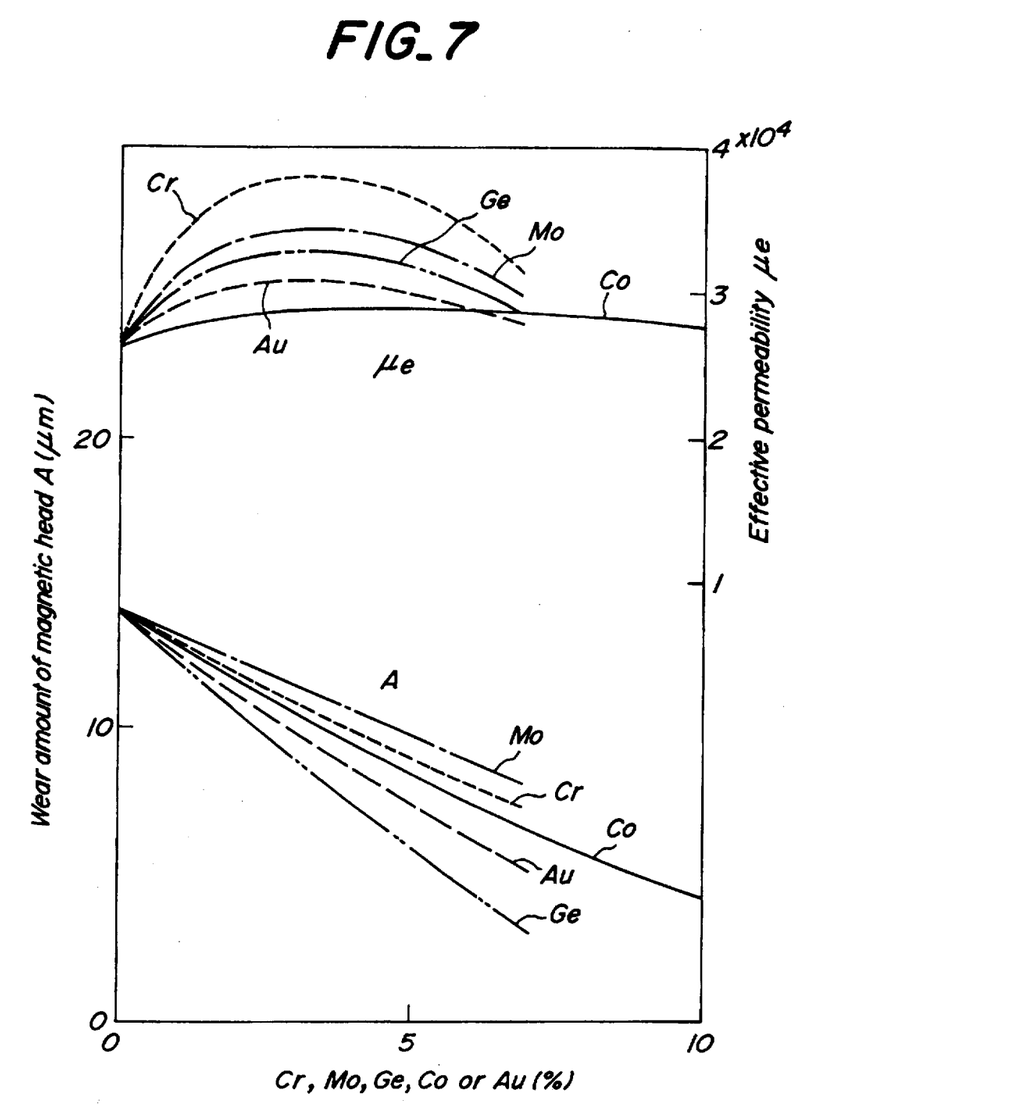
FIG. 7 is a graph showing the relationship between various properties and addition amounts of each element in case of adding Cr, Mo, Ge, Au or Co to 79.8% Ni-Fe-6.0% Nb-0.083% C alloy.

FIG. 7 is a graph showing a wear amount and an effective permeability of a magnetic head in case of adding Cr, Mo, Ge, Au or Co to a 79.8% Ni-Fe-6.0% Nb-0.083% C alloy, and when Cr, Mo, Ge, Au or Co is added, an effective permeability becomes high and a wear amount is decreased, but the addition of more than 7% of Cr, Mo, Ge or Au unfavorably makes a saturated flux density less than 4000G. Moreover, the addition of more than 10% of Co makes a residual magnetization large and a magnetization noise is unfavorably increased.

Figure 8:
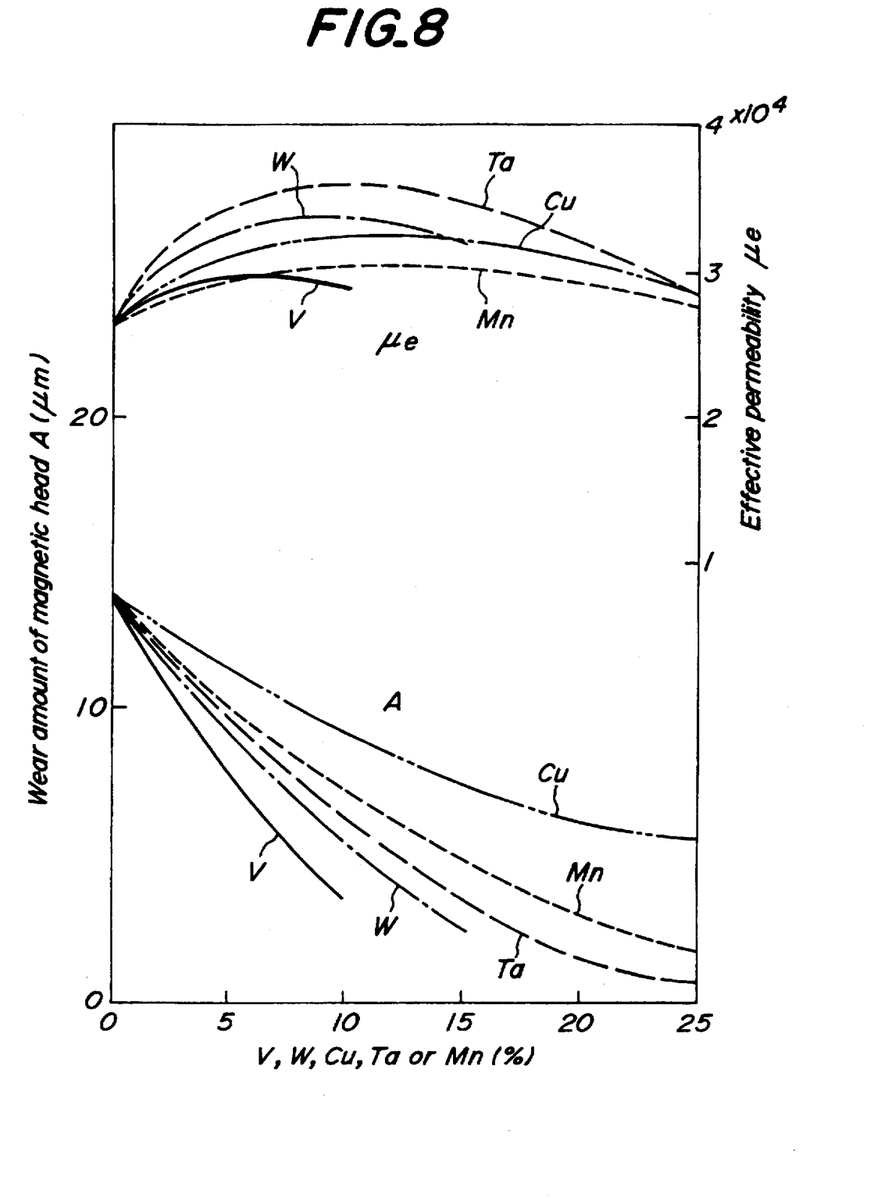
FIG. 8 is a graph showing the relationship between various properties and addition amounts of each element in case of adding V, W, Cu, Ta or Mn to 79.8% Ni-Fe-6.0% Nb-0.083% C alloy.

FIG. 8 is a graph showing a wear amount and an effective permeability of a magnetic head in case of adding V, W, Cu, Ta or Mn to the same 79.8% Ni-Fe-6.0% Nb-0.083% C alloy, and when V, W, Cu, Ta or Mn is added, an effective permeability becomes high and a wear resistance is decreased, but when more than 10% of V, more than 15% of W and more than 25% of Cu, Ta or Mn are added thereto, a saturated flux density unfavorably becomes less than 4000G.

Figure 9:
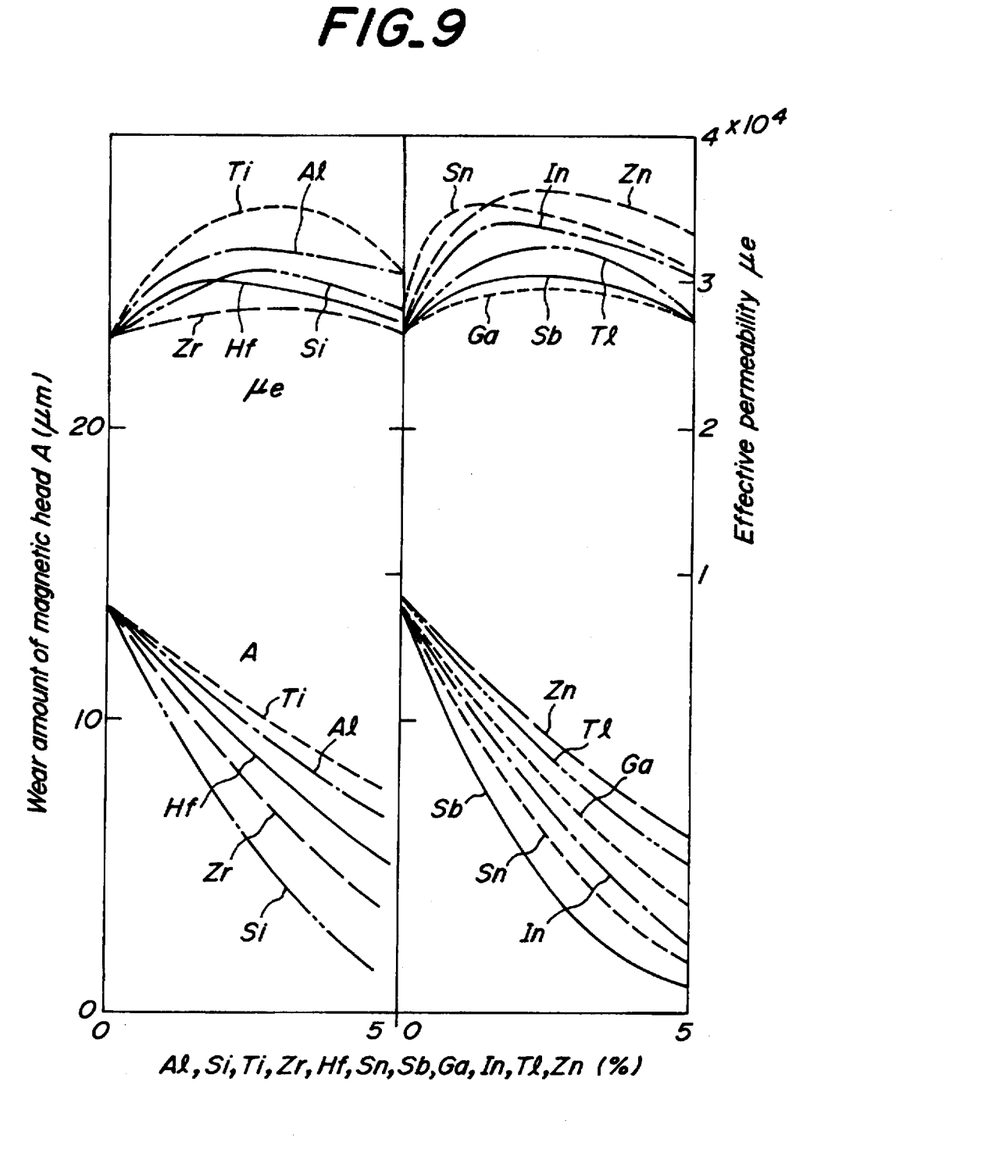
FIG. 9 is a graph showing the relationship between various properties and addition amounts of each element in case of adding Al, Si, Ti, Zr, Hf, Sn, Sb, Ga, In, Tl or Zn to 79.8% Ni-Fe-6.0% Nb-0.083% C alloy.

FIG. 9 is a graph showing the case of adding Al, Si, Ti, Zr, Hf, Sn, Sb, Ga, In, Tl or Zn to the same 79.8% Ni-Fe-6.0% Nb-0.083% C alloy, and when Al, Si, Ti, Zr, Hf, Sn, Sb, Ga, In, Tl or Zn is added, an effective permeability becomes high and a wear amount is decreased, but when more than 5% of Si, Ti, Zr, Hf, Ga, In or Tl is added, a saturated flux density becomes more than 4000G, and when more than 5% of Zn, Al, Sn or Sb is added, forging becomes unfavorably difficult.

Figure 10:
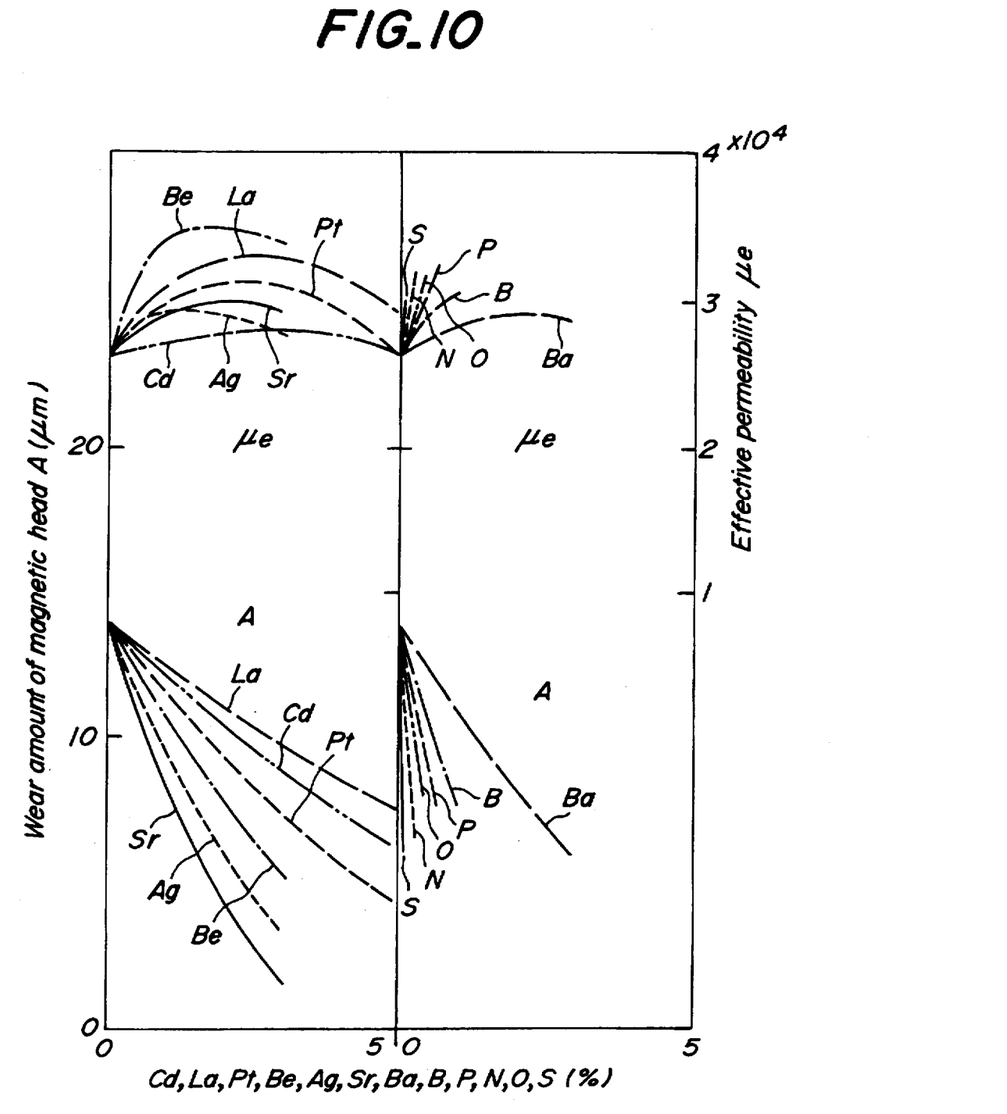
FIG. 10 is a graph showing the relationship between various properties and addition amounts of each element in case of adding Cd, La, Pt, Be, Ag, Sr, Ba, B, P, N, O or S to 79.8% Ni-Fe-6.0% Nb-0.083% C alloy.

FIG. 10 is a graph showing the case of adding Cd, La, Pt, Be, Ag, Sr, Ba, B, P, N, O or S to the same 79.8% Ni-Fe-6.0% Nb-0.083% C alloy, and when Cd, La, Pt, Be, Ag, Sr, Ba, B, P, N, O or S is added, an effectively permeability becomes high and a wear resistance is decreased, but when more than 5% of Cd, La and Pt and more than 3% of Be, Sr and Ba are added, a saturated flux density becomes less than 4000G, and when more than 3% of Ag, more than 1% of B, more than 0.7% of P, more than 0.3% of N, more than 0.3% of O or more than 0.1% of S is added, forging becomes unfavorably difficult.

In the present invention, a hot working at a temperature above 900° C. is necessary for accelerating the formation of a recrystallization texture of {110}<112>+{311}<112>+ {111}<112>, and a cold working is necessary for developing a recrystallization texture of {110}<112>+{311}<112>+ {111}<112>, and as seen in FIGS. 1, 2, 3 and 4, in addition of more than 0.0003–0.7%, preferably 0.0007–0.5%, more preferably 0.001–0.5% of C, after hot working at a temperature above 900° C., particularly in case of applying cold working of more than 50% of a working ratio, the development of a recrystallization texture of {110}<112>+ {311}<112>+{111}<112> is remarkable, a wear resistance is considerably improved, and its effective permeability is high. Moreover, heating followed to the above cold working is necessary for developing a recrystallization texture of {110}<112>+{311}<112>+{111}<112> together with unification of a texture and removal of working strain, and obtaining a highly effective permeability and an excellent wear resistance, but as seen in FIG. 5, an effective permeability and a wear resistance are remarkably improved by particularly heating at a temperature above 900° C.

Moreover, a repetition of the above cold working and the following heating at a temperature above 900° C. and below a melting point is effective for increasing integration of a recrystallization texture of {110}<112>+{311}<112>+ {111}<112> and improving a wear resistance. In this case, even if the working ratio of a final cold working is less than 50%, a recrystallization texture of {110}<112>+ {311}<112>+{111}<112> is obtained, but it is included in a technical idea of the present invention. Therefore, the cold working ratio of the present invention means a working ratio summing up cold workings in the whole manufacturing steps, but does not mean a final cold working ratio only.

Cooling from a temperature above 900° C. and below a melting point to a temperature more than an ordered-disordered lattice transformation point (about 600° C.) does not particularly have an influence upon magnetism which is obtained by quenching or slow cooling, but as seen in FIG.

6, a cooling rate at a temperature above this transformation point has a great influence upon magnetism. That is, by cooling from a temperature above transformation point to a room temperature at a suitable cooling rate of 10020 C./sec to 1° C./gr corresponding to the composition of alloy, a degree of order is appropriately regulated, and excellent magnetism is obtained. In the above cooling rate, if quenching is conducted at a cooling rate close to 100° C./sec, a degree of order becomes small, and if cooling is conducted at a faster cooling rate, the order of degree does not proceed and becomes further small to deteriorate magnetism. However, as seen in FIG. 5, when an alloy having this small degree of order is reheated and cooled at 200° C.–600° C. below the transformation point for more than 1 minute and less than 100 hours corresponding to the composition of alloy, the degree of order proceeds to become an appropriate degree of order, and magnetism is improved. On the other hand, slow cooling is conducted from a temperature above the transformation point at a cooling rate such as less than 1° C./hr, the degree of order unfavorably proceeds, and magnetism is lowered.

Moreover, the above heat treatment in a hydrogen-existing atmosphere is particularly effective for increasing an effective permeability.

The reason why the alloy composition is limited to Ni 60–90%, Nb 0.5–14%, C 0.0003–0.7% and the remainder Fe, and the element added as a secondary component is limited to 0.001–30% in total of at least one element selected from the group consisting of less than 7% of Cr, Mo, Ge, Au, less than 10% of Co, V, less than 15% of W, less than 25% of Cu, Ta, Mn, less than 5% of Al, Si, Ti, Zr, Hf, Sn, Sb, Ga, In, Tl, Zn, Cd, rare earth element, platinum element, less than 3% of Be, Ag, Sr, Ba, less than 1% of B, less than 0.7% of P, less than 0.3% of N, less than 0.3% of O and less than 0.1% of S is, as apparent from each example, Tables 4 and 5 and drawing, because the alloy has an effective permeability of more than 3000, a saturated flux density of more than 4000G and a recrystallization texture of {110}<112>+ {311}<112>+{111}<112>, and is excellent in wear resistance in this composition range, but when departing from this composition range, a magnetic property or wear resistance is deteriorated.

That is, when Nb is less than 0.5% and C is less than 0.0003%, a recrystallization texture of {110}<112>+ {311}<112>+{111}<112> is not sufficiently developed so as to make a wear resistance worse, and when Nb is more than 14% and C is more than 0.7%, forging becomes difficult, an effective permeability becomes less than 3000 and a saturated flux density becomes less than 4000G.

An alloy within a composition range of Ni 60–90%, Nb 0.5–14%, C 0.0003–0.7% and the remainder Fe has an effective permeability of more than 3000, a saturated flux density of more than 4000G, an excellent wear resistance and a good workability, but in general, when either one of Cr, Mo, Ge, Au, W, V, Cu, Ta, Mn, Al, Zr, Si, Ti, Hf, Ga, In, Tl, Zn, Cd, rare earth element, platinum element, Be, Ag, Sr, Ba, B, P, N, O or S is further added thereto, there is an effect of particularly increasing an effective permeability, when Co is added thereto, there is an effect of particularly increasing a saturated flux density, when either one of Au, Mn, Ti, Co, rare earth element, Be, Sr, Ba or B is added thereto, there is an effect of increasing a forgeability and a workability, and an addition of either one of Al, Sn, Au, Ag, Ti, Zn, Cd, Be, Ta, V, P or S and carbides of each element of a secondary component effectively develop a recrystallization texture of {110}<112>+{311}<112>+{111}<112> and improve a wear resistance.

EMBODIMENT

Examples of the present invention are explained below.

EXAMPLE 1

Manufacture of Alloy No. 7 (composition Ni=80.3%, Nb=5.5%, C=0.1120%, Fe=the remainder)

As a raw material, use was made of an iron-carbon mother alloy consisting of electrolytic nickel and electrolytic iron of 99.9% purity, niobium of 99.8% purity and 3.9% of carbon. In order to manufacture a sample, the total weight 800 g of a raw material was charged in an alumina crucible, molten in vacuo by a high frequency induction electric furnace, then fully stirred to form a homogeneous molten alloy. Then, the alloy was injected in a mold having a hole of 25 mm in diameter and 170 mm in height, and the thus obtained ingot was forged at about 1150° C. to form a sheet of 7 mm in thickness. Moreover, the sheet was hot rolled to a suitable thickness at a temperature between above 1000° C. and 1300° C., then cold worked at a room temperature and various working ratios to form a thin sheet of 0.1 mm, and the thin sheet was punched into a ring sheet of 45 mm in outer diameter and 33 mm in inner diameter. Next, in case of applying various heat treatments thereto and using it as a core of magnetic properties and a magnetic head, the wear amount of a magnetic tape after running for 400 hours at 90% humidity and 50° C. was measured by a Tarrysurf surface roughness gauge and properties shown in Table 1 were obtained.

TABLE 1

| Working and heat treatment | Effective permeability µe | Saturated flux density Bs(G) | Coercive force Hc(Oe) | Wear amount (µm) |
|---|---|---|---|---|
| Rolled at 30% cold working ratio, heated in hydrogen at 1150° C. for 2 hours and cooled at 600° C./hr | 14600 | 7160 | 0.025 | 130 |
| Rolled at 70% cold working ratio, heated in hydrogen at 1150° C. for 2 hours and cooled at 600° C./hr | 23200 | 7160 | 0.017 | 28 |
| Rolled at 90% cold working ratio, heated in hydrogen at 700° C. for 3 hours and cooled at 600° C./hr | 5300 | 7140 | 0.090 | 137 |
| Rolled at 90% cold working ratio, heated in hydrogen at 1150° C. for 2 hours and cooled at 600° C./hr | 24800 | 7170 | 0.016 | 8 |
| Rolled at 90% cold working ratio, heated in hydrogen at 1250° C. for 2 hours and cooled at 600° C./hr | 25000 | 7180 | 0.017 | 12 |
| Rolled at 90% cold working ratio, heated in hydrogen at 1400° C. for 1 hour and cooled at 600° C./hr | 24900 | 7190 | 0.015 | 8 |
| Rolled at 95% cold working ratio, heated | 24600 | 7170 | 0.016 | 10 |

TABLE 1-continued

| Working and heat treatment | Effective permeability μe | Saturated flux density Bs(G) | Coercive force Hc(Oe) | Wear amount (μm) |
|---|---|---|---|---|
| in hydrogen at 1150° C. for 1 hour and cooled at 600° C./hr | | | | |

EXAMPLE 2

Manufacture of Alloy No. 8 (composition Ni=79.8%, Nb=6.0%, C=0.083%, Fe=the remainder).

As a raw material, use was made of an iron-carbon mother alloy consisting of electrolytic nickel, electrolytic iron and niobium of the same purity as in Example 1 and 3.9% of carbon. In order to manufacture a sample, the total weight 800 g of a raw material was charged in an alumina crucible, molten in vacuo by a high frequency induction electric furnace, then fully stirred to form a homogeneous molten alloy. Then, the alloy was injected in a mold having a hole of 25 mm in diameter and 170 mm in height, and the thus obtained ingot was forged at a temperature of about 1100° C. to form a sheet of about 7 mm in thickness. Moreover, the sheet was hot rolled to a suitable thickness at a temperature between above 1000° C. and 1250° C., then cold rolled at a room temperature and various working ratios to form a thin sheet of 0.1 mm, and punched into a ring sheet of 45 mm in outer diameter and 33 mm in inner diameter. Then, in case of applying various heat treatments thereto and using as a magnetic properties and a core of magnetic head, the wear amount of a magnetic tape after running for 400 hours at 90% humidity and 50° C. was measured by a Tarrysurf surface roughness gauge and properties shown in Table 2 were obtained.

TABLE 2

| Working and heat treatment | Effective permeability μe | Saturated flux density Bs(G) | Coercive force Hc(Oe) | Wear amount (μm) |
|---|---|---|---|---|
| Rolled at 20% cold working ratio, heated in hydrogen at 1100° C. for 2 hours and cooled at 400° C./hr | 15300 | 7100 | 0.023 | 122 |
| Rolled at 70% cold working ratio, heated in hydrogen at 1100° C. for 2 hours and cooled at 400° C./hr | 24500 | 7100 | 0.015 | 26 |
| Rolled at 85% cold working ratio, heated in hydrogen at 700° C. for 3 hours and cooled at 400° C./hr | 5800 | 7080 | 0.075 | 130 |
| Rolled at 85% cold working ratio, heated in hydrogen at 1100° C. for 2 hours and cooled at 400° C./hr | 26100 | 7100 | 0.014 | 14 |
| Rolled at 85% cold working ratio, heated in hydrogen at 1200° C. for 2 hours and cooled at 400° C./hr | 26300 | 7120 | 0.012 | 10 |

TABLE 2-continued

| Working and heat treatment | Effective permeability μe | Saturated flux density Bs(G) | Coercive force Hc(Oe) | Wear amount (μm) |
|---|---|---|---|---|
| Rolled at 85% cold working ratio, heated in hydrogen at 1400° C. for 1 hour and cooled at 400° C./hr | 26200 | 7130 | 0.011 | 6 |
| Rolled at 95% cold working ratio, heated in hydrogen at 1100° C. for 1 hour and cooled at 400° C./hr | 26200 | 7100 | 0.013 | 8 |

EXAMPLE 3

Manufacture of Alloy No. 28 (composition Ni=76.5%, Nb=4.0%, C=0.035%, Ta=8.0%, Fe=the remainder)

As a raw material, use was made of an iron-carbon mother alloy consisting of electrolytic nickel, electrolytic iron and niobium of the same purity as in Example 1 and 99.9% purity of carbon. In order to manufacture a sample, the total amount 800 g of a raw material was charged in an alumina crucible, molten in vacuo by a high frequency induction electric furnace, then fully stirred to form a homogeneous molten alloy. Then, the alloy is injected in a mold having a hole of 25 mm in diameter and 170 mm in height, and the thus obtained ingot was forged at a temperature of about 1250° C. to form a sheet of about 7 mm in thickness. Moreover, the sheet was hot rolled to a suitable thickness at a temperature between above 1000° C. and 1400° C., then cold worked at a room temperature and various working ratios to form a thin sheet of 0.1 mm, and the thin sheet was punched into a ring sheet of 45 mm in outer diameter and 33 mm in inner diameter.

Next, in case of applying various heat treatments thereto and using as a magnetic properties and a core of magnetic head, the wear amount of a magnetic tape after running for 400 hours at 90% humidity and 50° C. was measured by a Tarrysurf surface roughness gauge and properties shown in Table 3 were obtained.

Moreover, properties of typical alloys are as shown in Tables 4 and 5.

TABLE 3

| Working and heat treatment | Effective permeability μe | Saturated flux density Bs(G) | Coercive force Hc(Oe) | Wear amount (μm) |
|---|---|---|---|---|
| Rolled at 20% cold working ratio, heated in hydrogen at 1200° C. for 2 hours and cooled at 200° C./hr | 38200 | 6650 | 0.005 | 105 |
| Rolled at 75% cold working ratio, heated in hydrogen at 1200° C. for 2 hours and cooled at 200° C./hr | 39200 | 6660 | 0.005 | 10 |
| Rolled at 90% cold | 13500 | 6340 | 0.030 | 83 |

TABLE 3-continued

| Working and heat treatment | Effective permeability μe | Saturated flux density Bs(G) | Coercive force Hc(Oe) | Wear amount (μm) |
|---|---|---|---|---|
| working ratio, heated in hydrogen at 800° C. for 3 hours and cooled at 200° C./hr | | | | |
| Rolled at 90% cold working ratio, heated in hydrogen at 1100° C. for 2 hours and cooled at 200° C./hr | 36800 | 6670 | 0.005 | 7 |
| Rolled at 90% cold working ratio, heated in hydrogen at 1150° C. for 2 hours and cooled at 200° C./hr | 35000 | 6670 | 0.006 | 7 |
| Rolled at 90% cold working ratio, heated in hydrogen at 1250° C. for 1 hour and cooled at 200° C./hr | 39500 | 6670 | 0.004 | 5 |
| Rolled at 90% cold working ratio, heated in hydrogen at 1350° C. for 1 hour and cooled at 200° C./hr | 39200 | 6650 | 0.004 | 4 |

TABLE 4

| Alloy No. | Ni | Nb | C | Secondary component | Cold working ratio (%) | Heating temperature (°C.) | Cooling rate (°C./hr) |
|---|---|---|---|---|---|---|---|
| 5 | 78.8 | 2.0 | 0.3640 | — | 95 | 1200 | 10000 |
| 7 | 80.3 | 5.5 | 0.1120 | — | 90 | 1150 | 600 |
| 8 | 79.8 | 6.0 | 0.0830 | — | 85 | 1100 | 400 |
| 12 | 80.0 | 9.5 | 0.0326 | — | 90 | 1250 | 200 |
| 16 | 80.3 | 11.5 | 0.0083 | — | 75 | 1350 | 100 |
| 21 | 81.0 | 4.5 | 0.0740 | Cr 3.0 | 90 | 1150 | 300 |
| 25 | 79.5 | 5.7 | 0.1052 | Mo 5.5 | 95 | 1200 | 400 |
| 28 | 76.5 | 4.0 | 0.0350 | Ta 8.0 | 75 | 1200 | 200 |
| 32 | 79.0 | 6.5 | 0.0724 | Sn 1.0, Mn 10.5 | 85 | 1100 | 400 |
| 35 | 68.5 | 3.5 | 0.1351 | Cu 15.0, Ga 1.0 | 90 | 1050 | 800 |
| 37 | 80.5 | 8.0 | 0.0246 | Au 3.0, Tl 1.0 | 75 | 1200 | 400 |
| 41 | 83.5 | 10.0 | 0.0507 | W 5.0, Sr 1.0 | 60 | 1250 | 100 |
| 45 | 82.0 | 5.0 | 0.0732 | Al 3.0, In 1.0 | 80 | 1000 | 200 |
| 47 | 81.5 | 2.5 | 0.1625 | V 4.5, Ba 0.7 | 90 | 1100 | 100 |
| 50 | 65.0 | 8.0 | 0.0705 | Co 10.0, B 0.1 | 70 | 1050 | 100 |
| 53 | 81.5 | 4.0 | 0.1253 | Si 2.0, Ag 1.5 | 95 | 1200 | 200 |
| 57 | 80.5 | 5.5 | 0.0463 | Ti 2.0, Be 0.5 | 85 | 1250 | 100 |
| 60 | 80.0 | 6.0 | 0.0684 | Zr 2.5, Zn 0.3 | 90 | 1050 | 400 |
| 63 | 80.3 | 5.0 | 0.0957 | Hf 3.0, Sb 0.7 | 70 | 1100 | 200 |
| 67 | 79.5 | 7.5 | 0.0482 | Ce 1.5, No 3.0 | 80 | 1150 | 400 |
| 72 | 79.0 | 4.0 | 0.1073 | Pt 2.0, Ta 5.0 | 95 | 1350 | 800 |
| 75 | 79.8 | 9.0 | 0.0271 | P 0.1, Cu 7.0 | 65 | 950 | 100 |
| 79 | 79.5 | 8.5 | 0.0540 | S 0.03, Cr 3.0 | 85 | 1200 | 100 |
| 83 | 80.5 | 3.0 | 0.0883 | Cd 0.5, V 3.0 | 90 | 1050 | 1000 |
| 86 | 79.7 | 5.5 | 0.0615 | N 0.05, Hf 2.0 | 90 | 1100 | 400 |
| 90 | 75.5 | 7.5 | 0.1307 | O 0.05, Ge 3.0 | 80 | 1200 | 200 |
| permalloy | 78.5 | — | — | — | 98 | 1100 | 100000 |

TABLE 5

| Alloy No. | Reheating temperature (°C.) · time (hour) | Effective permeability μe (1 KHz) | Saturated flux density (G) | Coercive force (Oe) | Wear amount (μm) |
|---|---|---|---|---|---|
| 5 | — | 17200 | 9500 | 0.026 | 8 |
| 7 | — | 24800 | 7170 | 0.016 | 8 |
| 8 | — | 26100 | 7100 | 0.014 | 14 |
| 12 | — | 28600 | 6030 | 0.013 | 8 |
| 16 | — | 21400 | 5250 | 0.017 | 6 |
| 21 | 420, 2 | 37300 | 6510 | 0.007 | 8 |
| 25 | 380, 10 | 34800 | 6730 | 0.009 | 7 |
| 28 | — | 39200 | 6660 | 0.005 | 10 |
| 32 | — | 36600 | 6240 | 0.009 | 8 |
| 35 | — | 32000 | 6360 | 0.010 | 7 |
| 37 | 400, 5 | 34800 | 6140 | 0.008 | 9 |
| 41 | — | 34600 | 5880 | 0.009 | 6 |
| 45 | — | 34900 | 6270 | 0.009 | 8 |
| 47 | — | 32700 | 6530 | 0.011 | 6 |
| 50 | 420, 5 | 33400 | 7620 | 0.012 | 7 |
| 53 | — | 33700 | 6810 | 0.008 | 6 |
| 57 | — | 37600 | 6630 | 0.007 | 8 |
| 60 | — | 38200 | 6380 | 0.006 | 7 |
| 63 | — | 34700 | 6260 | 0.009 | 6 |
| 67 | 380, 15 | 36200 | 6080 | 0.008 | 6 |
| 72 | — | 34600 | 6920 | 0.009 | 7 |
| 75 | — | 35100 | 6330 | 0.007 | 5 |
| 79 | — | 34200 | 5960 | 0.010 | 5 |
| 83 | 350, 50 | 33800 | 6850 | 0.012 | 8 |
| 86 | — | 34000 | 7260 | 0.011 | 6 |
| 90 | — | 33300 | 6050 | 0.012 | 6 |
| permalloy | — | 2800 | 10800 | 0.055 | 180 |

As described above, the present alloy is easy in working, excellent in wear resistance, and has a saturated flux density of more than 4000G, a high effective permeability of more than 3000 and a low coercive force, so that the alloy is suitable as not only a magnetic alloy for core and shield case of magnetic recording and reproducing head but also a magnetic material of general electromagnetic devices requiring wear resistance and high permeability.

In addition, the earth element consists of Sc, Y and lanthanum elements, which effects are uniform, and the platinum element consists of Pt, Ir, Ru, Rh, Pd and Os, which effects are also uniform, so that these elements are regarded to be the same effective components.

In short, the alloy of the present invention is easy in forging, has an extremely excellent wear resistance by forming a recrystallization texture of {110}<112>+{311}<112>+{111}<112>, further has a saturated flux density of more than 4000G and a high effective permeability, so that it is suitable as not only magnetic alloy for magnetic recording and reproducing head but also a magnetic material of general electromagnetic devices requiring wear resistance and high permeability.

What is claimed is:

1. A wear-resistant high permeability alloy consisting essentially of by weight of Ni 60–90%, Nb 0.5–14%, C 0.0003–0.7% and the remainder Fe and having a recrystallization texture of {110}<112>+{311}<112>+{111}<112> with an effective permeability of more than 3000 at 1 KHz and a saturated flux density of more than 4000G.

2. A wear-resistant high permeability alloy consisting of by weight of Ni 60–90%, Nb 0.5–14%, C 0.0003–0.7%, and as a secondary component 0.001–30% in total of at least one element selected from the group consisting of less than 7% of Cr, Mo, Ge, Au, respectively, less than 10% of Co, V, respectively, less than 15% of W, less than 25% of Cu, Ta, Mn, respectively, less than 5% of Al, Si, Ti, Zr, Hf, Sn, Sb, Ga, In, Tl, Zn, Cd, rare earth element, and platinum element, respectively, less than 3% of Be, Ag, Sr, Ba, respectively, less than 1% of B, less than 0.7% of P, less than 0.3% of N, less than 0.3% of O, less than 0.1% of S and the remainder Fe and having a recrystallization texture of {110}<112>+{311}<112>+{111}<112> with an effective permeability of more than 3000 at 1 KHz and a saturated flux density of more than 4000G.

* * * * *